(12) United States Patent
Wilson et al.

(10) Patent No.: US 11,483,423 B2
(45) Date of Patent: Oct. 25, 2022

(54) METHOD OF ENHANCING PERSONAL CONTACT INFORMATION DISPLAY ON A MOBILE DEVICE

(71) Applicants: Sean Wilson, Brampton (CA); Liza Savage, Brampton (CA)

(72) Inventors: Sean Wilson, Brampton (CA); Liza Savage, Brampton (CA)

( * ) Notice: Subject to any disclaimer, the term of this patent is extended or adjusted under 35 U.S.C. 154(b) by 291 days.

(21) Appl. No.: 15/424,775

(22) Filed: Feb. 3, 2017

(65) Prior Publication Data
US 2018/0227402 A1 Aug. 9, 2018

(51) Int. Cl.
*H04M 1/27457* (2020.01)
*H04M 1/57* (2006.01)
*H04M 1/2757* (2020.01)
*H04M 1/27453* (2020.01)
*H04M 1/27475* (2020.01)
*H04M 1/72433* (2021.01)

(52) U.S. Cl.
CPC ..... *H04M 1/27457* (2020.01); *H04M 1/2757* (2020.01); *H04M 1/27453* (2020.01); *H04M 1/27475* (2020.01); *H04M 1/575* (2013.01); *H04M 1/576* (2013.01); *H04M 1/72433* (2021.01)

(58) Field of Classification Search
CPC ......... H04M 1/27457; H04M 1/27453; H04M 1/27475; H04M 1/2757; H04M 1/575; H04M 1/576; H04M 1/72433
See application file for complete search history.

(56) References Cited

U.S. PATENT DOCUMENTS

| | | | |
|---|---|---|---|
| 6,744,868 B2 | 6/2004 | Mani | |
| 7,142,646 B2 | 11/2006 | Zafar et al. | |
| 7,260,198 B1 | 8/2007 | Scott et al. | |
| 7,903,794 B1* | 3/2011 | Bales | H04M 3/53333 379/88.25 |
| 8,194,832 B2 | 6/2012 | Lohr | |
| 8,218,744 B2* | 7/2012 | Belz | H04M 1/56 379/142.04 |
| 8,290,126 B2 | 10/2012 | Chatterjee et al. | |
| 8,300,777 B1* | 10/2012 | Lerda | H04W 4/12 379/88.11 |
| 8,793,615 B2 | 7/2014 | Stallings et al. | |
| 10,691,314 B1* | 6/2020 | Freeman | G06F 3/04842 |
| 2005/0091272 A1* | 4/2005 | Smith | G06Q 10/10 |
| 2006/0229063 A1* | 10/2006 | Koch | H04M 3/4931 455/418 |
| 2007/0129112 A1* | 6/2007 | Tarn | H04M 1/72552 455/566 |

(Continued)

*Primary Examiner* — Steven S Kelley
(74) *Attorney, Agent, or Firm* — Orin Del Vecchio (57) ABSTRACT

A method of enhancing personal contact information display on a mobile device is disclosed herein. The method of enhancing personal contact information display on a mobile device includes integrating a software code with an operating system for the mobile device. The code is configured to interact with a voice message module, the phone module, the internet module, and the personal contact information module of the mobile device operating system. The method of enhancing personal contact information display on a mobile device is useful for viewing contact information and accessing at least one voicemail left by a first-user.

19 Claims, 5 Drawing Sheets

(56) References Cited

U.S. PATENT DOCUMENTS

| | | | |
|---|---|---|---|
| 2008/0167078 A1* | 7/2008 | Eibye | H04M 1/72583 455/566 |
| 2010/0151831 A1 | 6/2010 | Hao et al. | |
| 2010/0318614 A1 | 12/2010 | Sager et al. | |
| 2011/0183651 A1* | 7/2011 | Mundy | H04M 1/2757 707/E17.014 |
| 2011/0223889 A1* | 9/2011 | Stephen | G06Q 10/10 455/414.1 |
| 2011/0235790 A1* | 9/2011 | Strope | H04M 1/72433 379/93.02 |
| 2012/0040716 A1* | 2/2012 | Kuncl | G03B 21/14 455/556.1 |
| 2013/0023238 A1* | 1/2013 | Kaplan | H04M 3/42042 455/411 |
| 2013/0035054 A1* | 2/2013 | Ashton | H04M 1/576 455/404.1 |
| 2013/0109363 A1* | 5/2013 | Yang | G06F 3/04883 455/414.1 |
| 2014/0274002 A1 | 9/2014 | Hogan et al. | |
| 2014/0282135 A1* | 9/2014 | Segre | G06F 9/453 715/764 |
| 2014/0330656 A1* | 11/2014 | Zhou | H04M 1/72439 705/16 |
| 2015/0126253 A1* | 5/2015 | Tyler | H04B 17/318 455/566 |
| 2015/0341290 A1* | 11/2015 | Cherifi | H04L 51/066 709/206 |
| 2015/0373178 A1* | 12/2015 | Felt | H04M 1/6505 455/413 |
| 2016/0037331 A1* | 2/2016 | Vernon | G06Q 10/107 455/414.1 |
| 2016/0080934 A1* | 3/2016 | Yu | H04W 4/60 455/418 |
| 2016/0219150 A1* | 7/2016 | Brown | H04W 4/16 |
| 2016/0241696 A1* | 8/2016 | Bjorklund | H04M 1/72412 |
| 2017/0006445 A1* | 1/2017 | Bluvband | H04M 1/27453 |
| 2017/0163781 A1* | 6/2017 | Seshan | B32B 27/304 |
| 2017/0180957 A1* | 6/2017 | Lakkis | H04W 4/16 |
| 2018/0139314 A1* | 5/2018 | Acton | H04W 4/12 |

* cited by examiner

METHOD OF ENHANCING PERSONAL CONTACT INFORMATION DISPLAY ON A MOBILE DEVICE

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of telecommunications and more specifically relates to caller identification.

2. Description of Related Art

U.S. Pub. No. 2013/0035054 to Ashton relates to a phone with multi-portal access for display during incoming and outgoing calls. The described phone with multi-portal access for display during incoming and outgoing calls includes a phone, which allows a user to input profile data that is provided to another phone upon the phone calling or receiving a call from another phone. The profile data does not need to be stored at another phone. The profile data includes an image that is displayed at another phone upon an incoming or outgoing call.

BRIEF SUMMARY OF THE INVENTION

In view of the foregoing disadvantages inherent in the known telecommunications art, the present disclosure provides a novel voice network display. The general purpose of the present disclosure, which will be described subsequently in greater detail, is to provide an enhanced personal contact information display on a mobile device.

A method of enhancing personal contact information display on a mobile device is disclosed herein. The method may include the steps of: integrating a software code with an operating system for the mobile device (the software code configured to interact with a voice message module, a phone module, an internet module, and a personal contact information module of the operating system); configuring at least one parameter of the software code for augmenting personal contact information by a first-user; transmitting the personal contact information of the first-user to at least one server for access by at least one second-user; and visually-displaying the personal contact information of the first-user on the mobile device of the at least one second-user when the at least one second-user retrieves a voice message from the first-user via the voice message module; double-tapping the profile picture of the first-user to display a history of voice messages left by the first-user, the history display of voice messages being individually-selectable for listening by the at least one second user; and selecting a user-interface to listen to the most recent voice message left by the first-user.

According to another embodiment, the method of enhancing personal contact information display on a mobile device may comprise steps of: downloading a mobile application program having a software code configured to integrate with an operating system of the mobile device; installing the software code configured to interact with a voice message module, a phone module, an internet module, and a personal contact information module of the operating system; configuring at least one parameter of the software code for augmenting personal contact information by a first-user; transmitting the personal contact information of the first-user to at least one server for access by at least one second-user; and visually-displaying the personal contact information of the first-user on the mobile device of the at least one second-user when at the least one second-user retrieves a voice message from the first-user via the voice message module; double-tapping the profile picture of the first-user to display a history of voice messages left by the first-user, the history display of voice messages being individually-selectable for listening by the at least one second user; and selecting a user-interface to listen to the most recent voice message left by the first-user.

According to another embodiment, a method of configuring a plurality of parameters to enhance personal contact information display may comprise steps of: selecting a settings module of a mobile device; inputting a profile picture of the first-user; inputting a name of the first-user, inputting a job title of the first-user; inputting at least one employer name of the first-user and an address of the at least one employer name of the first-user; inputting a phone number of the first-user; inputting an electronic mail address of the first-user; inputting information to direct access to at least one social media platform of the first-user; viewing the personal contact information display as shown on a mobile device of at least one second-user; and saving the personal contact information display to at least one server for access by the at least one second-user.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, method of enhancing personal contact information display on a mobile device, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to an caller identification enhancement in the field of telecommunications and more particularly to a method of enhancing personal contact information display on a mobile device as used to improve personal contact information display.

Generally, the present disclosure teaches a means for displaying a detailed profile as shown on a caller-contact on a voicemail module and other caller display modules on a mobile device, such as including a personal profile picture, company name and/or company logo, job title, email address, social media accounts and addresses, and a fax number. The detailed profile may be configured to pop up when a contact calls or leaves a voicemail. It may include a log of left voicemails that can be selected individually. All, some, or none of the parameters may be displayed based on the caller's preference. The software code may be designed to enhance business communications, and may eliminate the need to check all voicemails to locate a particular one, as well as provide an ability to know who is calling or has called prior to continuing communication.

Figure 1:
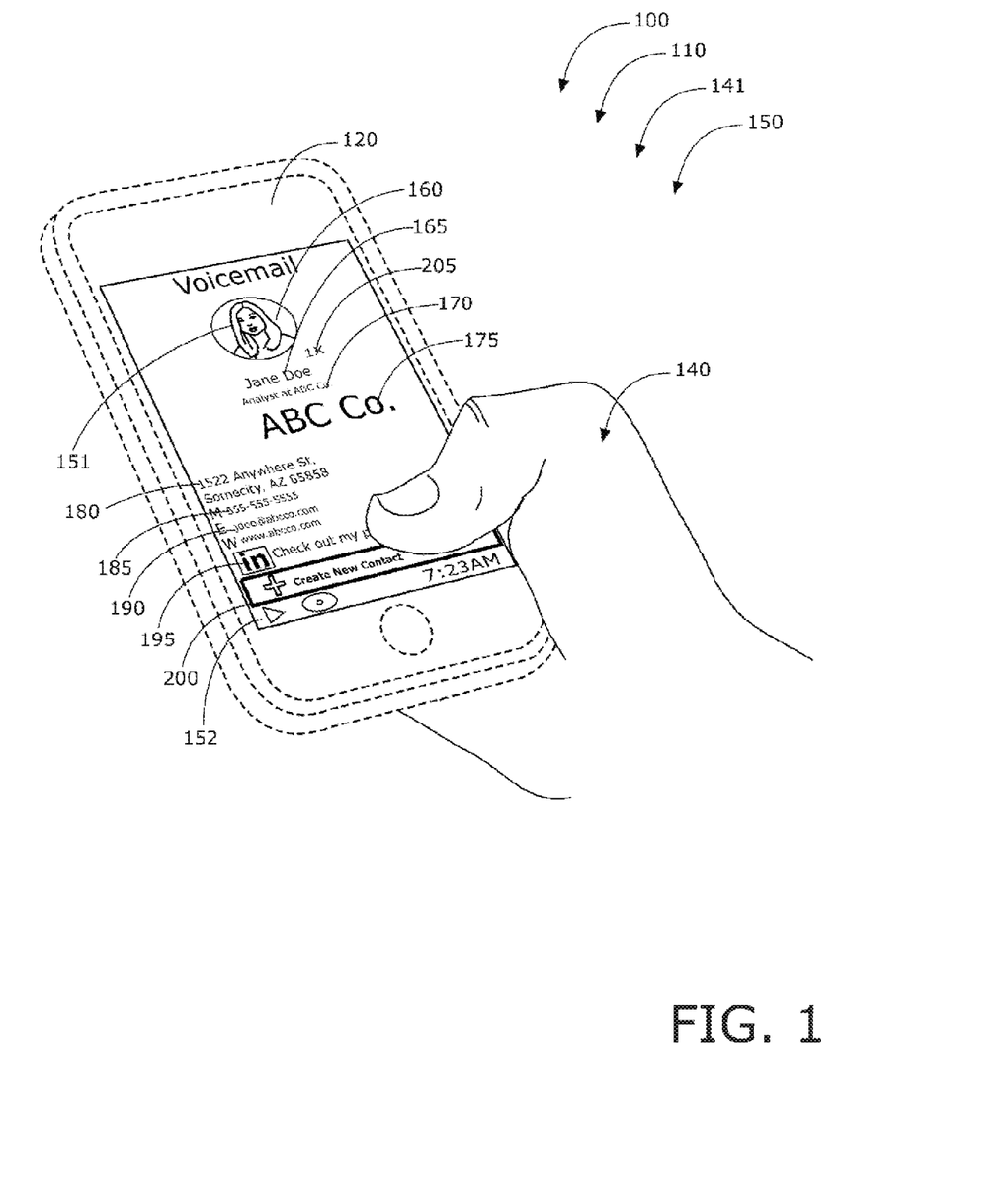
FIG. 1 is a perspective view of the method of enhancing personal contact information display on the mobile device during an 'in-use' condition, according to an embodiment of the disclosure.

Referring now more specifically to the drawings by numerals of reference, there is shown in FIGS. 1-4, various views of a personal contact information display 100. FIG. 1 shows a personal contact information display 100 during an 'in-use' condition 150, according to an embodiment of the present disclosure.

As shown, the personal contact information display 100 may be beneficial for use by a first-user 141 and at least one second-user 140 to enhance a personal contact information display 100 on a mobile device 120. As illustrated, the personal contact information display 100 may include the method of enhancing personal contact information display on a mobile device 120. A software code 110 integrated into an operating system of the mobile device 120 may be configured to display a plurality of parameters by a first-user 141, which may then be shown on the mobile device 120 of at least one second-user 140 on the occurrence of the first-user 141 leaving a voice message for the second-user 140.

In one embodiment, the plurality of parameters may include a profile picture 160 of the first-user 141, the name 165 of the first-user 141, the job title 170 of the first-user 141, the employer name 175 for the first-user 141, the employer's address 180 of the first-user 141, a phone number 185 for the first-user 141, an electronic mail address 190 for the first-user 141, and information and indicia related to at least one social media platform 195 for the first-user 141.

Further, the plurality of parameters may be configured to be displayed via the voice message module on the mobile device 120 of the at least one second-user 140 after the first-user 141 leaves a voice message for the at least one second-user 140. In addition, the first-user 141, in an on-demand basis, may edit the plurality of parameters. Further, the first-user 141 may optionally dis-include any of the plurality of parameters from display on the mobile device 120 of the at least one second-user 140.

In now referring to a display of a profile picture 160, the software code 110 may be configured to display a profile picture 160 of the first-user 141. The first-user 141 may, with the mobile device 120 in the settings mode, select the profile picture 160 from a photo storage module within the mobile device 120 of the first-user 141. The profile picture 160 may then be stored in the personal contact information module of the first-user's 141 mobile device 120. The selected profile picture 160 may then be able to be displayed on the mobile device 120 of the at least one second-user 140.

In now referring to the name 165 of the first user 141, the software code 110 may be configured to display the name 165 of the first-user 141 via the voice message module on the mobile device 120 of the at least one second-user 140. The first-user 141 may, with the mobile device 120 in the settings mode, edit the name 165 to be displayed and the name 165 may then be stored in the personal contact information module of the first-user's 141 mobile device 120. The name 165 may then be able to be displayed on the mobile device 120 of the at least one second-user 140.

In now referring to the job title 170 of the first-user 141, the software code 110 may be configured to display the job title 170 of the first-user 141 via the voice message module on the mobile device 120 of the at least one second-user 140. The first-user 141 may, with the mobile device 120 in the settings mode, edit the job title 170 to be displayed and the job title 170 may then be stored in the personal contact information module of the first-user's 141 mobile device 120. The job title 170 may then be able to be displayed on the mobile device 120 of the at least one second-user 140.

In now referring to at least one employer name 175 of the first-user 141, the software code 110 may be configured to display at least one employer name 175 of the first-user 141 via the voice message module on the mobile device 120 of the at least one second-user 140. The first-user 141 may, with the mobile device 120 in the settings mode, edit the at least one employer name 175 to be displayed and the at least one employer name 175 may then be stored in the personal contact information module of the first-user's 141 mobile device 120. The at least one employer name 175 may then be able to be displayed on the mobile device 120 of the at least one second-user 140.

In now referring to the employer's address 180 of the first-user 141, the software code 110 may be configured to display the employer's address 180 of the first-user 141 via the voice message module on the mobile device 120 of the at least one second-user 140. The first-user 141 may, with the mobile device 120 in the settings mode, edit the employer's address 180 to be displayed and the employer's address 180 may then be stored in the personal contact information module of the first-user's 141 mobile device 120. The employer's address 180 may then be able to be displayed on the mobile device 120 of the at least one second-user 140.

In now referring to the phone number 185 of the first-user 141, the software code 110 may be configured to display the phone number 185 of the first-user 141 via the voice message module on the mobile device 120 of the at least one second-user 140. The software code 110 may be able to retrieve the phone number 185 from the first user's 141 mobile device 120 sim card. The software code 110 may further be configured to activate the phone number 185 using a telephone module of the mobile device 120 via an interaction with the touchscreen of the mobile device 120 by the at the least one second-user 140. In another embodiment of the present disclosure, the software code 110 may be able to retrieve the phone number 185 from the phone module for the mobile device 120. The selected profile picture 160 may then be able to be displayed on the mobile device 120 of the at least one second-user 140.

In now referring to an electronic mail address 190 of the first-user 141, the software code 110 may be configured to display an electronic mail address 190 of the first-user 141 via an electronic mail message module of the mobile device 120 of the at the least one second-user 140. The first-user 141 may, with the mobile device 120 in the settings mode, edit the electronic mail address 190 to be displayed and the electronic mail address 190 may then be stored in the personal contact information module of the first-user's 141 mobile device 120. The electronic mail address 190 of the first-user 141 may be configured to interact with the electronic mail module of the operating system of the mobile device 120 via an interaction with a touchscreen of the mobile device 120 of the at the least one second-user 140. The first-user 141 may be able to edit the electronic mail address 190 to be displayed and the electronic mail address 190 may then be stored in the personal contact information module of the first-user's 141 mobile device 120. The electronic mail address 190 may then be able to be displayed on the mobile device 120 of the at least one second-user 140.

In now referring to information and indicia related to at least one social media platform 195 of the at least one second-user 140, the software code 110 may be configured to display information and indicia related to at least one social media platform 195 on the mobile device 120 of the at least one second-user 140. The first-user 141 may, with the mobile device 120 in the settings mode, edit the information and indicia related to at least one social media platform 195 to be displayed and the information and indicia related to at least one social media platform 195 may then be stored in the personal contact information module of the first-user's 141 mobile device 120. The information and indicia related to at least one social media platform 195 may then be able to be displayed on the mobile device 120 of the at least one second-user 140. The software code 110 may further be configured to browse to the at least one social media platform 195 using the internet module of the mobile device 120 via an interaction with the touchscreen of the mobile device 120 by the at the least one second-user 140.

In addition, the software code 110 may be configured to display a counter 205 configured to increment when the first-user 141 completes an interaction with the voice message module on the mobile device 120 of the at least one second-user 140. The at least one second-user 140 may further be able to access an additional interface where previous voice messages may be viewed and subsequently selected for listening, if desired.

Further, the software code 110 may be configured to transfer the personal contact information 200 of the first-user 141 to the personal contact information module of the mobile device 120 of the at least one second-user 140 via an interaction with a touchscreen of the mobile device 120.

In continuing to refer to FIG. 1, the process steps for the embodiment of this disclosure for enhancing personal contact information display on a mobile device 120 may include integrating the software code 110 with an operating system for mobile devices 120 with the software code 110 configured to interact with the voice message module, the phone module, the internet module, and the personal contact information module of the operating system. The first-user 141 may then configure the at least one parameter of the software code 110 for augmenting personal contact information. When complete, the personal contact information of the first-user 141 may be transferred to at least one server 130 (FIG. 2) for access by at least one second-user 140. Lastly, the personal contact information of the first-user 141 may be visually-displayed on the mobile device 120 of the at least one second-user 140 when the at least one second-user 140 retrieves a voice message from the first-user 141 via the voice message module. The visually-displayed information may include additional interfaces, which may include access to a history display of the of voice messages left by the first-user 141 via double-tapping the profile picture 151 of the first-user 141. The history display of voice messages may be individually-selectable for listening by the at least one second user 140. Further, the second-user 140 may access a selectable user-interface 152 to listen to the most recent voice message left by the first-user 141.

Figure 2:
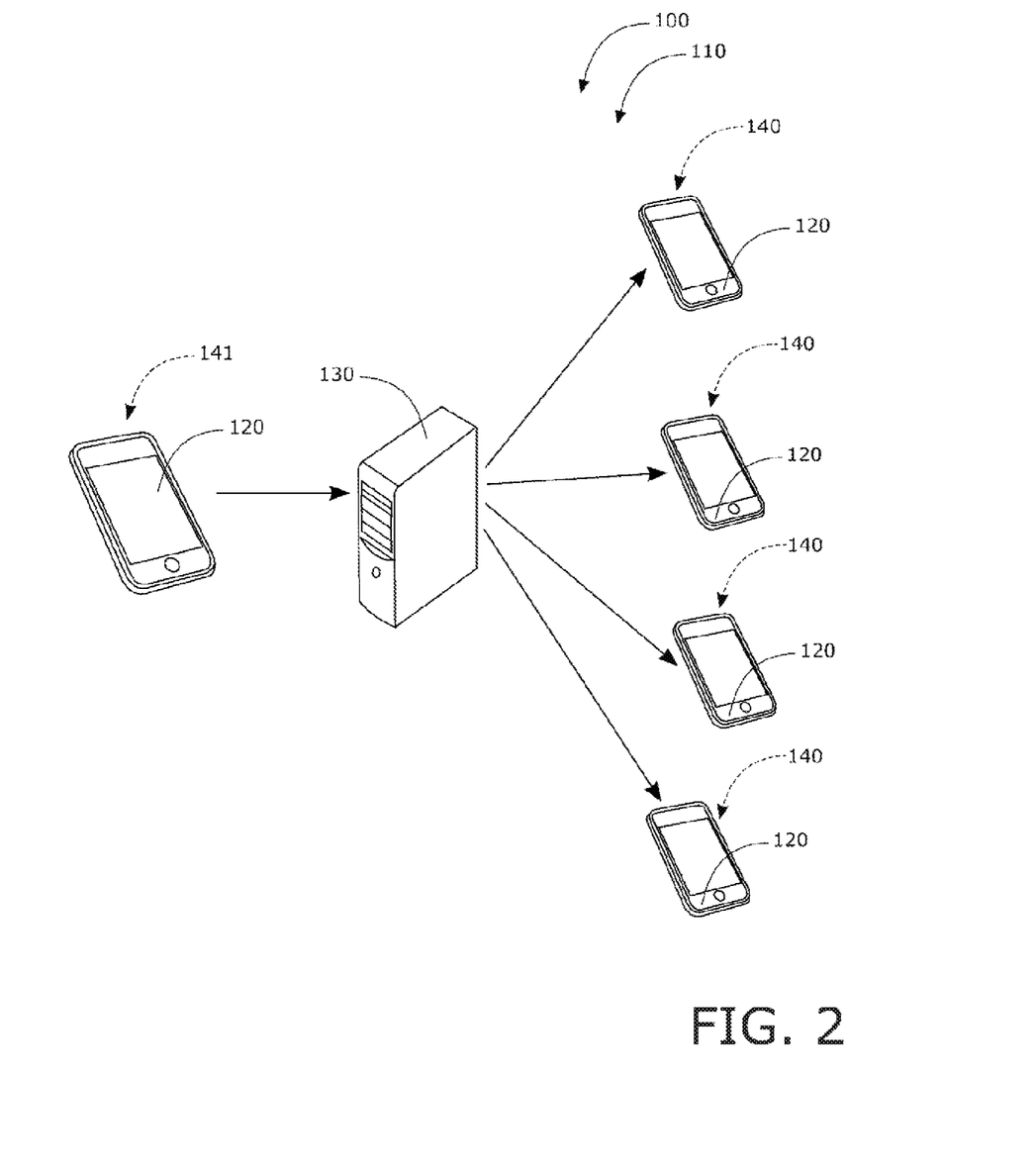
FIG. 2 is a pictorial view of the method of enhancing personal contact information display on a mobile device of FIG. 1, according to an embodiment of the present disclosure.

FIG. 2 shows a pictorial view of FIG. 1, according to an embodiment of the present disclosure. As above, after the first-user 141 has configured the at least one parameter and saves the parameters to the contact information module, the mobile device 120 of the first-user may transmit the personal contact information of the first-user 141 to at least one server 130. Once stored by at least one server 130, the personal contact information for the first-user 141 may be available to be accessed by the mobile device 120 of the at least one second-user 140.

In addition, the personal contact information of the first-user 141 may be visually-displayed on the mobile device 120 of the at least one second-user 140 and the at the least one second-user 140 may interact with the with the touchscreen of the mobile device 120. In alternate embodiments of the present disclosure, the interaction with the touchscreen of the mobile device may comprise a keyboard, a stylus, a finger, and alternately a face-to-face video conference. In further referring to the mobile device 120, the mobile device 120 may comprise a mobile phone, and alternatively a tablet. In alternate embodiments of the present disclosure, the mobile device 120 may further comprise a watch, and alternatively an in-vehicle display screen. Further, the mobile device 120 may comprise any portable electronic device having internet access.

Figure 3:
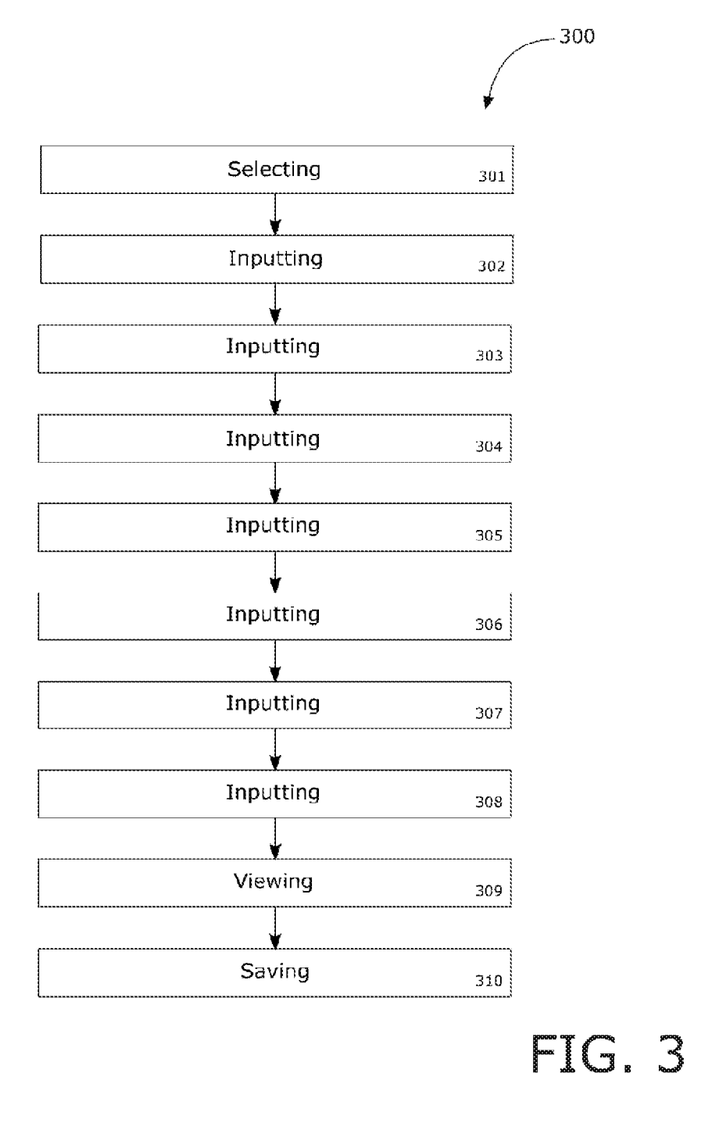
FIG. 3 is a flow diagram illustrating a method of use for configuring a plurality of parameters to enhance personal contact information display on the mobile device, according to an embodiment of the present disclosure.

FIG. 3 is a flow diagram illustrating a method for enhancing personal contact information display 100 on a mobile device 120, according to an embodiment of the present disclosure. In particular, the method for of configuring a plurality of parameters to enhance personal contact information display 300 may include one or more components or features of the personal contact information display 100 as described above. As illustrated, the method of configuring a plurality of parameters to enhance personal contact information display 300 may include the steps of: step one 301, selecting a settings module of a mobile device 120; step two, 302, inputting a profile picture 160 of the first-user 141; step three 303, inputting a name 165 of the first-user 141; step four 304, inputting a job title 170 of the first-user 141; step five 305, inputting at least one employer name 175 of the first-user 141 and an address of the at least one employer name 180 of the first-user 141; step six 306, inputting a phone number 185 of the first-user 141; step seven 307, inputting an electronic mail address 190 of the first-user 141; step eight 308, inputting information to direct access to at least one social media platform 195 of the first-user 141; step nine 309, viewing the personal contact information display 100 as shown on a mobile device 120 of at least one second-user 140; and step ten 310, saving the personal contact information display 100 to at least one server 130 for access by the at least one second-user 140.

Figure 4:
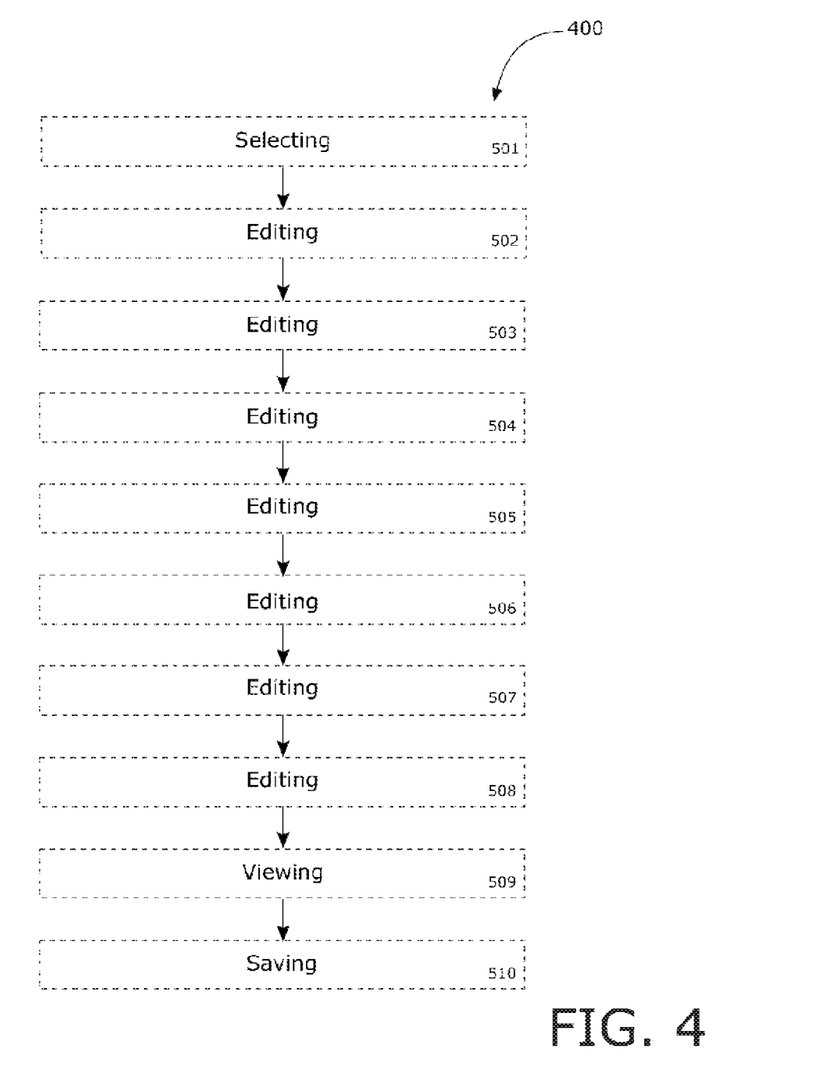
FIG. 4 is a flow diagram illustrating a method of use for editing a plurality of parameters to enhance personal contact information display, according to an embodiment of the present disclosure.

FIG. 4 is a flow diagram illustrating a method for enhancing personal contact information display 100 on a mobile device 120, according to an embodiment of the present disclosure. In particular, the method for method of editing a plurality of parameters to enhance personal contact information display 400 may include one or more components or features of the personal contact information display 100 as described above. As illustrated, the method for the editing a plurality of parameters to enhance personal contact information display 400 may include the steps of: step one 401, selecting a settings module of a mobile device 120; step two 402, editing a profile picture 160 of the first-user 141; step three 403, editing a name 165 of the first-user 141; step four 404, editing a job title 170 of the first-user 141; step five 405, editing at least one employer name 175 of the first-user 141 and an address of the at least one employer name 180 of the first-user 141; step six 406, editing a phone number 185 of the first-user 141; step seven 407, editing an electronic mail address 190 of the first-user 141; step eight 408, editing information to direct access to at least one social media platform 195 of the first-user 141; step nine 409, viewing the personal contact information display 100 as shown on a mobile device 120 of at least one second-user 140; and step ten 410, saving the personal contact information 100 to at least one server 130 for access by at least one second-user 140.

It should be noted that steps 401 through 410 are optional steps and may not be implemented in all cases. Optional steps of method of use 400 are illustrated using dotted lines in FIG. 4 so as to distinguish them from the other steps of method of use of 300 and 500. It should also be noted that the steps described in the method of use can be carried out in many different orders according to user preference.

Figure 5:
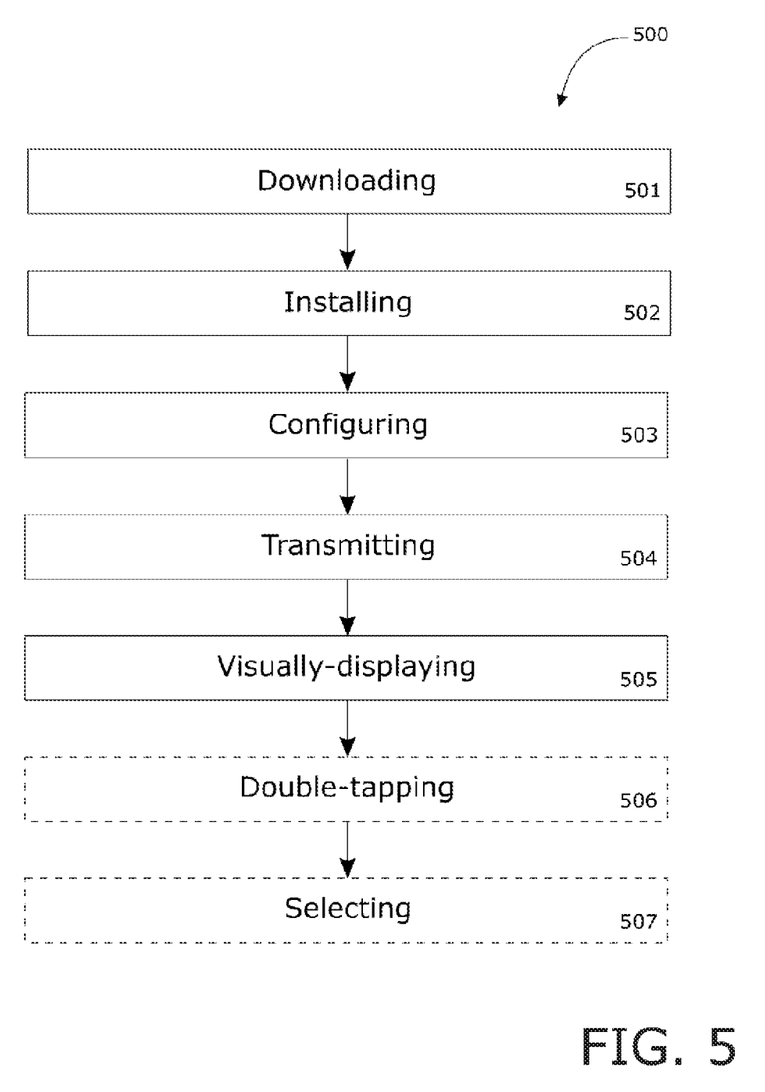
FIG. 5 is a flow diagram illustrating a method of use for the method of enhancing personal contact information display on the mobile device, according to an embodiment of the present disclosure.

FIG. 5 is a flow diagram illustrating a method for enhancing personal contact information display 100 on a mobile device 120, according to an embodiment of the present disclosure. In particular, the method of use for enhancing personal contact information display on a mobile device 500 may include one or more components or features of the personal contact information display 100 as described above. As illustrated, the method for the personal contact information display 500 may include the steps of: step one 501, downloading a mobile application program having a software code 110 configured to integrate with an operating system of the mobile device 120; step two 502, installing the software code 110 configured to interact with a voice message module, a phone module, an internet module, and a personal contact information module of the operating system; step three 503, configuring at least one parameter of the software code 110 for augmenting personal contact information 100 by a first-user 141; step four 504, transmitting the personal contact information 200 of the first-user 141 to at least one server 130 for access by at least one second-user 140; step five 505, visually-displaying the personal contact information 100 of the first-user 141 on the mobile device 120 of the at least one second-user 140 when at the least one second-user 140 retrieves a voice message from the first-user 141 via the voice message module; step six 506, double-tapping the profile picture 160 of the first-user 141 to display a history of voice messages left by the first-user 141, the history display of voice messages being individually-selectable for listening by the at least one second user 140; and step seven 507, selecting a user-interface to listen to the most recent voice message left by the first-user 141.

It should be noted that steps 506 and 507 are optional steps and may not be implemented in all cases. Optional steps of method of use 500 are illustrated using dotted lines in FIG. 5 so as to distinguish them from the other steps of method of use of 300 and 400. It should also be noted that the steps described in the method of use can be carried out in many different orders according to user preference.

The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the personal contact information display (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A method of enhancing personal contact information display on a mobile device, the method comprising:
    downloading a mobile application program, from at least one third party server, having a software code configured to integrate with an operating system of the mobile device;
    integrating the software code with an operating system for the mobile device, the software code configured to interact with a voice message module, a phone module, an Internet module, and a personal contact information module of the operating system, the voice message module operative to connect with a voice messaging service to retrieve and play back voice messages;
    configuring at least one parameter of the software code for augmenting personal contact information by a first-user;
    receiving, at a first user device, personal profile information which includes one or more parameters of personal contact information and information to be excluded from display;
    transmitting the personal contact information of the first-user contained in a first user profile to the at least one third party server for access by at least one second-user;
    detecting, at the mobile device, user interface interaction with the voice message module by the second user to retrieve a voice message from the first user;
    visually-displaying in the voice message module, during playback of the voice message, a counter value and the personal contact information of the first-user from the first user profile as retrieved from the third party server, on the mobile device of the at least one second-user when at the least one second-user retrieves the voice message from the first-user via the voice message module, incrementing the counter value to indicate the number of times the first user's personal information has been requested from the at least one third party server and displayed; and wherein the personal contact information of the first user is displayed where the first user and first user contact information are not previously known to the second user or in the personal contact information module of the operating system.

2. The method of claim 1 wherein the software code is configurable to display a profile picture of the first-user.

3. The method of claim 2 wherein the software code is configurable to allow the first-user to select the profile picture from a photo storage module of the mobile device of the first-user.

4. The method of claim 1 wherein the software code is configurable to display a name of the first-user via the voice message module during play back of a voice message from the first user.

5. The method of claim 1 wherein the software code is configurable to display a job title of the first-user via the voice message module during play back of a voice message from the first user.

6. The method of claim 1 wherein the software code is configurable to display at least one employer name of the first-user via the voice message module during play back of a voice message from the first user.

7. The method of claim 6 wherein the software code is configurable to display an address of the at least one employer name of the first-user via the voice message module during play back of a voice message from the first user.

8. The method of claim 1 wherein the software code is configurable to display a phone number of the first-user via the voice message module during play back of a voice message from the first user.

9. The method of use of claim 8 wherein the software code is configurable to activate the phone number using a telephone module of the mobile device via an interaction with a touchscreen of the mobile device by the at the least one second-user.

10. The method of use of claim 1 wherein the software code is configurable to display an electronic mail address of the first-user via an electronic mail message module of the mobile device of the at the least one second-user.

11. The method of use of claim 10 wherein the electronic mail address of the first-user is configurable to interact with the electronic mail module of the operating system of the mobile device via an interaction with a touchscreen of the mobile device of the at the least one second-user.

12. The method of use of claim 1 wherein the software code is configurable to display information and indicia related to at least one social media platform.

13. The method of use of claim 1 wherein the software code is configurable to transfer the personal contact formation of the first-user to a contact information module of the mobile device of the at least one second-user via an interaction with a touchscreen of the mobile device.

14. The method of claim 1 further comprising:
double-tapping a profile picture of the first-user to display a history of voice messages left by the first-user, the display of history of voice messages being individually-selectable for listening by the at least one second user; and selecting a user-interface to listen to a most recent voice message left by the first-user.

15. The method of use of claim 14 wherein the software code is configurable to display content from the first user profile as stored on the third party server, the content comprising one or more of:
a profile picture of the first-user;
a name of the first-user;
a job title of the first-user;
at least one employer name of the first-user and an address of the at least one employer name of the first-user;
a phone number of the first-user;
an electronic mail address of the first-user; and
information and indicia related to at least one social media platform of the first-user wherein the content is displayed via the voice message module of the mobile device of the at least one second-user.

16. The method of use of claim 15 wherein the mobile device comprises a mobile phone and alternatively a tablet.

17. The method of use of claim 15 wherein the mobile device comprises a watch and alternatively an in-vehicle display screen.

18. A method of use of claim 1 further comprising the steps of:
selecting a settings module of mobile device;
inputting a profile picture of the first-user;
inputting a name of the first-user;
inputting a job title of the first-user;
inputting at least one employer name of the first-user and an address of the at least one employer name of the first-user;
inputting a phone number of the first-user;
inputting an electronic mail address of the first-user;
inputting information to direct access to at least one social media platform of the first-user;
creating the first user profile from the inputted elements;
viewing the personal contact information display from the first user profile as shown on a mobile device of at least one second-user; and
saving the personal contact information display from the first user profile to at least one third party server for access by the at least one second-user.

19. The method of claim 18 comprising the optional steps of:
selecting a settings module of a mobile device;
editing a profile picture first-user;
editing a name of the first-user;
editing a job title of the first-user;
editing at least one employer name of the first-user and an address of the at least one employer name of the first-user;
editing a phone number of the first-user;
editing an electronic mail address of the first-user;
editing information to direct access to at least one social media platform of the first-user;
viewing the personal contact information display as shown on a mobile device of at least one second-user; and
saving the personal contact information to at least one third party server in the first user profile for access by the at least one second-user.

* * * * *